United States Patent
Higashino

[11] Patent Number: 5,845,936
[45] Date of Patent: Dec. 8, 1998

[54] COLLAPSIBLE OUTER COLUMN FORMED INTEGRAL WITH BRACKETS

[75] Inventor: Kiyoharu Higashino, Gunma-gun, Japan

[73] Assignee: NSK Ltd., Tokyo, Japan

[21] Appl. No.: 588,611

[22] Filed: Jan. 19, 1996

[30] Foreign Application Priority Data

Feb. 20, 1995 [JP] Japan .................................. 7-030909

[51] Int. Cl.[6] .................................................. B62D 1/19
[52] U.S. Cl. .......................... 280/775; 280/777; 74/493
[58] Field of Search ................... 280/777, 775, 280/779, 780; 74/492, 493; 188/371, 374

[56] References Cited

U.S. PATENT DOCUMENTS

| | | | |
|---|---|---|---|
| 3,394,612 | 7/1968 | Bogosoff et al. | 188/371 |
| 3,600,970 | 8/1971 | Loofbourrow | 188/371 |
| 4,228,695 | 10/1980 | Trevisson et al. | 280/777 |
| 4,914,970 | 4/1990 | Mastrofrancesco et al. | 280/777 |
| 4,991,871 | 2/1991 | Sadakata | 280/777 |
| 4,998,999 | 3/1991 | Yuzuriha et al. | 280/777 |
| 5,074,586 | 12/1991 | Baskett | 280/775 |
| 5,209,135 | 5/1993 | Ichikawa | 280/777 |
| 5,464,251 | 11/1995 | Castellon | 280/777 |

FOREIGN PATENT DOCUMENTS

| | | | |
|---|---|---|---|
| 59-81253 | 5/1984 | Japan | 74/492 |
| 4-57541 | 9/1992 | Japan . | |
| 6-49458 | 6/1994 | Japan . | |

*Primary Examiner*—Peter C. English
*Attorney, Agent, or Firm*—Shapiro and Shapiro

[57] ABSTRACT

In order to achieve the curtailment of costs by simplifying the manufacture of parts, the custody of parts and the assembling work, a vertically movable bracket of a tilt mechanism, a mounting bracket for mounting combination switches, and a cylinder bracket of a steering lock mechanism are all formed integrally with an outer column. Also, when the tilt mechanism is omitted, a fixed bracket and the outer column are formed integrally with each other.

11 Claims, 9 Drawing Sheets

COLLAPSIBLE OUTER COLUMN FORMED INTEGRAL WITH BRACKETS

BACKGROUND OF THE INVENTION

1. Field of the Invention

This invention relates to a shock absorbing type steering column which is utilized to rotatably support a steering shaft constituting the steering apparatus of an automobile and which shortens its full length during, a collision while absorbing shock energy, thereby alleviating the shock applied to a driver's body having collided with a steering wheel.

2. Related Background Art

The steering apparatus of an automobile is constructed so as to transmit the movement of a steering wheel to a steering gear through a steering shaft. The steering shaft is supported on a portion of a vehicle body (the lower portion of a dashboard) through a steering column. Also, in an accident, subsequent to a primary collision in which an automobile collides with another automobile or the like, there occurs a secondary collision in which the driver's body collides with the steering wheel. To protect the driver's life during such secondary collision, it has heretofore been widely practiced to make the steering shaft and steering column shock absorbing which, when a shock is applied thereto, shortens their full length while absorbing this shock in order to alleviate the shock energy applied to the driver's body.

Figures 13, 14:
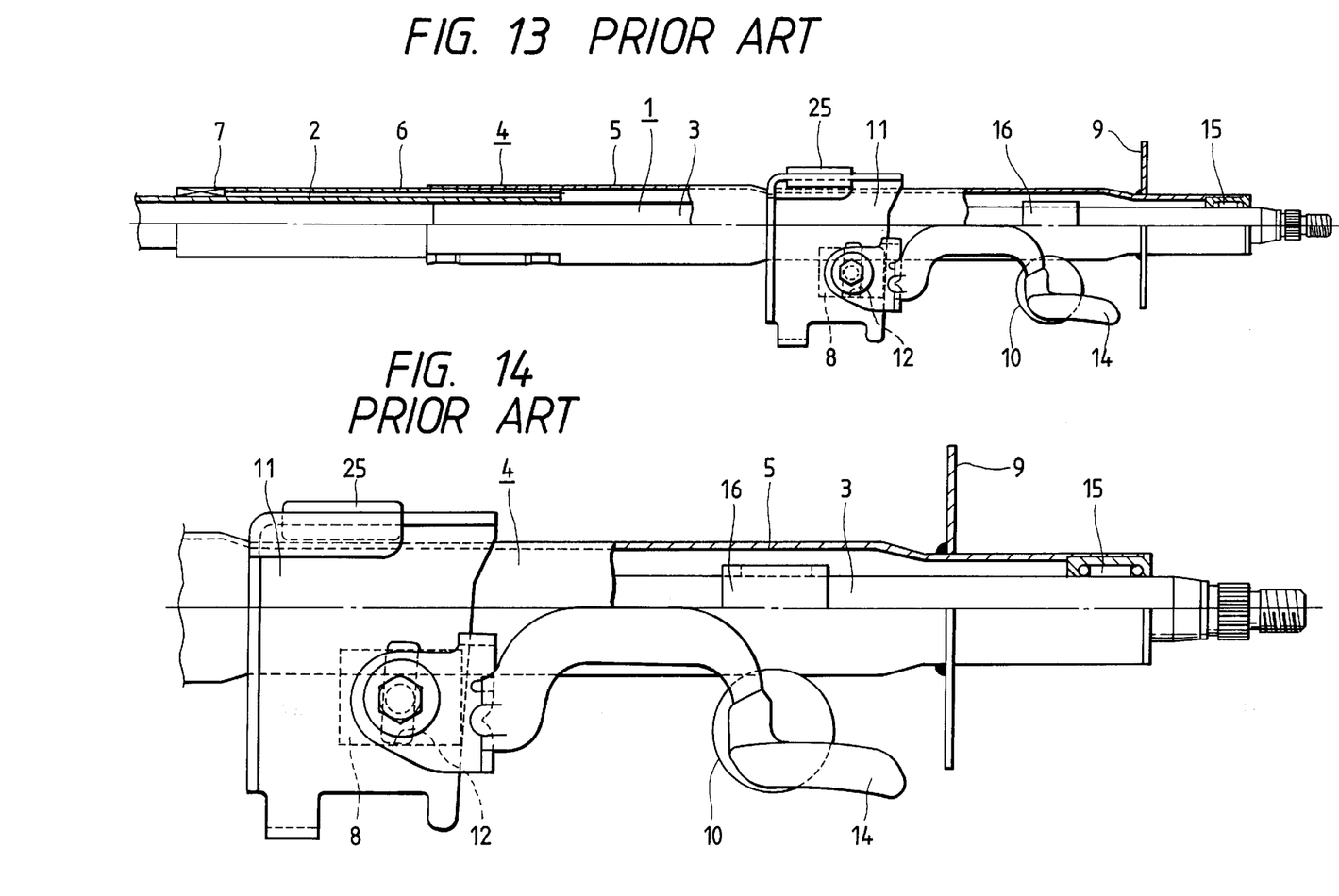
FIG. 13 is a side view partly in longitudinal cross-section showing an example of the structure according to the prior art.
FIG. 14 is an enlarged view of the right portion of FIG. 13.

FIGS. 13 and 14 of the accompanying drawings show a shock absorbing type steering shaft and steering column heretofore widely used for such a purpose. A tilt mechanism for adjusting the height position of a steering wheel is incorporated in the structure shown in FIGS. 13 and 14. The steering shaft 1 comprises a tubular outer shaft 2 and a circular rod-like inner shaft 3, the rear end portion (the right end portion as viewed in FIG. 13) of the outer shaft 2 and the fore end portion (the left end portion as viewed in FIG. 13) of the inner shaft 3 being fitted together only for displacement in the axial direction (the left to right direction as viewed in FIGS. 13 and 14). Such a steering shaft 1 has the function of transmitting the movement (rotational motion) of a steering wheel (not shown) fixed to the rear end portion of the inner shaft 3, but shortens its full length when a strong force in the axial direction is applied thereto.

Figure 1:
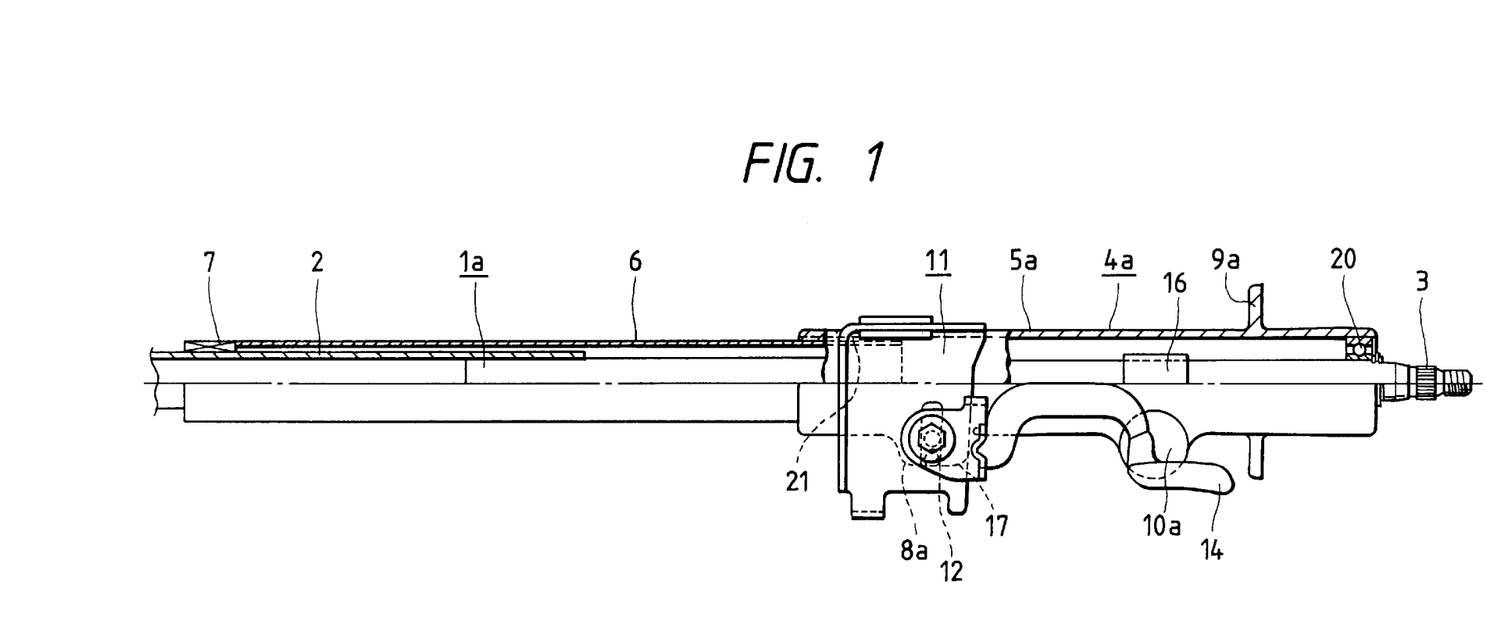
FIG. 1 is a side view half in longitudinal cross-section showing a first embodiment of the present invention.
Figure 2:
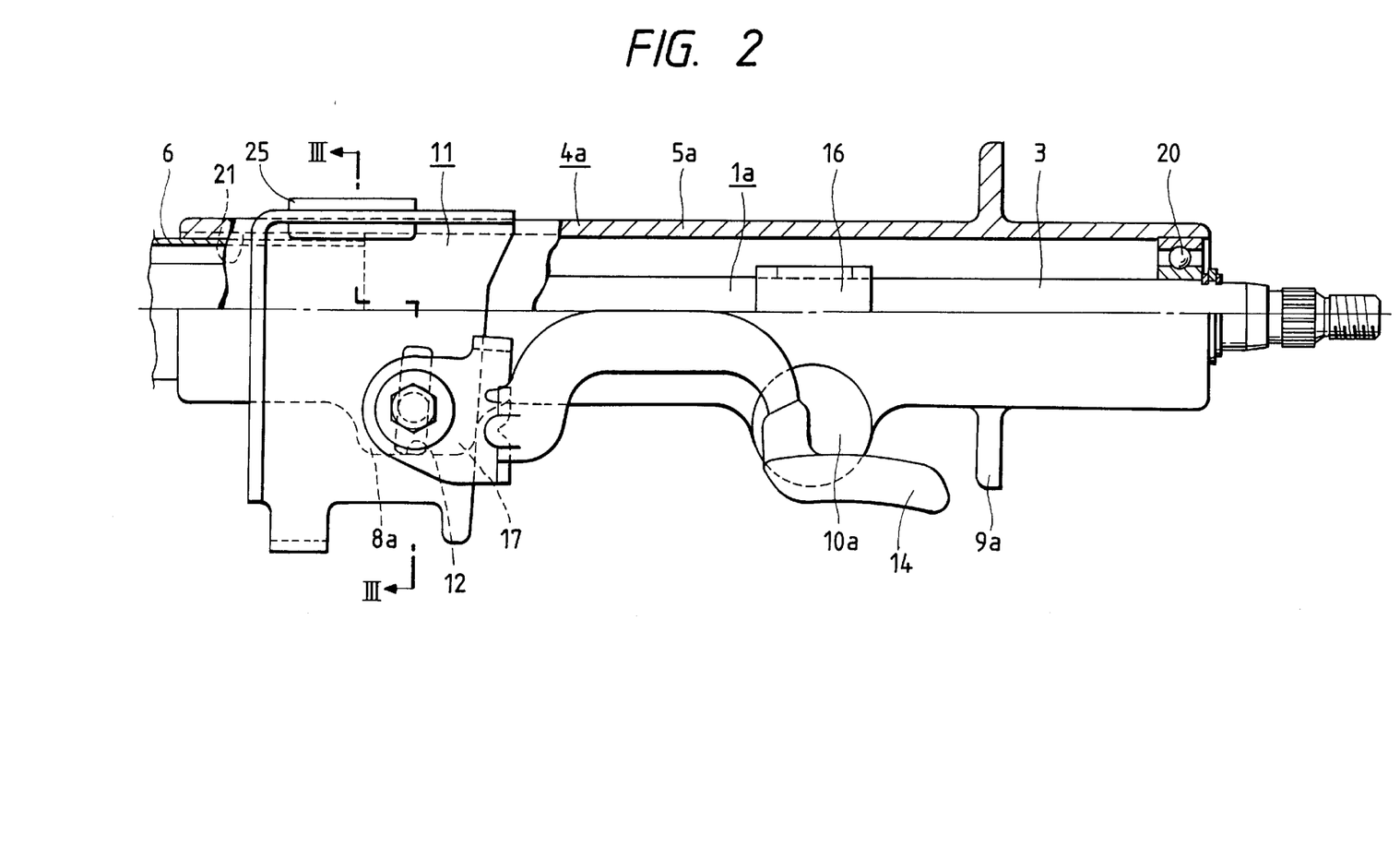
FIG. 2 is an enlarged view of the right portion of FIG. 1.

On the other hand, a steering column 4 comprises an outer column 5 and an inner column 6 each made into a cylindrical shape by the use of a steel plate, the outer column 5 and the inner column 6 being telescopically combined together. That is, the fore end portion of the outer column 5 is fitted on the rear end portion of the inner column 6 with sufficient fitting strength. Accordingly, the flexural strength of the steering column 4 as a whole is sufficiently secured, but when a strong force in the axial direction is applied to it, the steering column 4 shortens its full length. The intermediate portion of the outer shaft 2 is rotatably supported on the fore end portion of the inner column 6 by a bearing 7. This bearing 7 is of such structure that permits not only rotational motion but also motion in the axial direction, like a needle bearing or a slide bearing. Also, the rear end portion of the inner shaft 3 is rotatably supported on the rear end portion of the outer column 5 through a needle bearing 15. This portion need not always be of such structure that permits displacement in the axial direction. Accordingly, instead of the needle bearing 15, a ball bearing 20 of the deep groove type or the like may sometimes be used as shown in FIGS. 1 and 2 showing an embodiment of the present invention.

A vertically movable bracket 8 is welded and fixed to the underside of the intermediate portion of the outer column 5, a mounting bracket 9 is welded and fixed to the outer periphery of the rear end portion of the outer column 5, and a cylinder bracket 10 is welded and fixed to the underside of the outer column 5 between these two brackets 8 and 9. The vertically movable bracket 8 constitutes the aforementioned tilt mechanism and is vertically moved with the outer column 5 during the adjustment of the height position of the steering wheel. That is, the vertically movable bracket 8 is embraced from the opposite sides thereof by a fixed bracket 11 fixed to the vehicle body side. When the height position of the steering wheel is to be adjusted, a tilt bolt 13 (see FIG. 3 of the accompanying drawings showing an embodiment of the present invention) extending through the vertically movable bracket 8 in the left to right direction (the front to back direction as viewed in FIGS. 13 and 14) and engaged with a slot 12 formed in the fixed bracket 11 is operated by means of a tilt lever 14. The structure and action of such a tilt mechanism are well known and have no direct relation to the gist of the present invention and therefore need not be shown and described in detail.

Also, a direction indicator and various switches (combination switches) such as a light switch and a wiper switch are mounted on the mounting bracket 9. Further, the cylinder bracket 10 is formed into a cylindrical shape and has mounted therein the key cylinder of a steering lock device which is a kind of burglarproof device. A key lock collar 16 is welded and fixed to the intermediate portion of the inner shaft 3 which is opposed to this key cylinder. In a state in which an ignition key has been pulled out, a lock pin 26 (see FIG. 11 of the accompanying drawings which shows a third embodiment of the present invention) provided in the key cylinder resiliently protrudes from the inner peripheral surface of the outer column 5 and is engaged with an engagement hole formed in the key lock collar 16 to thereby prevent the rotation of the inner shaft 3.

During a secondary collision resulting from a collision accident, a strong force directed forwardly (leftwardly as viewed in FIGS. 13 and 14) is applied from the steering wheel which has received the driver's body to the inner shaft 3 and the full length of the steering shaft 1 is shortened to permit the steering wheel to be displaced forwardly. The strong force directed forwardly which has been applied to the steering wheel is also applied to the outer column 5. As a result, the fixed bracket 11 comes off the vehicle body or the vertically movable bracket 8 slips out from the fixed bracket 11, thereby permitting the outer column 5 to be displaced forwardly. As a result, the shock applied to the driver's body which has collided with the steering wheel is alleviated.

In the case of the prior-art energy absorbing type steering column constructed and acting as described above, there is no particular problem in terms of the protection of the driver during a collision accident, but the number of parts is great and the manufacture of the parts, the custody of the parts and the assembling work become cumbersome and thus, unavoidably the costs of manufacture increase. Particularly, a plurality of parts are coupled and fixed together by welding or bolting and therefore, an attempt to secure necessary dimensional accuracy would make the assembling work considerably cumbersome and increase the costs of manufacture.

SUMMARY OF THE INVENTION

The present invention has as its object the provision of a shock absorbing type steering column which requires a small number of parts and is easy to assemble.

The shock absorbing type steering column of the present invention is provided with an outer column having at least its inner peripheral surface made into a cylindrical surface, a cylindrical inner column inserted in the outer column, and a bracket fixed to the outer peripheral surface of the outer column. The inner peripheral surface of the outer column and the outer peripheral surface of the inner column are strongly fitted together for displacement only when a strong force in the axial direction of these two columns is applied thereto.

Particularly, in the shock absorbing type steering column of the present invention, the outer column and the bracket are integrally formed of a non-ferrous material. The non-ferrous material for integrally forming the outer column and the bracket may preferably be a non-ferrous metal such as an aluminum alloy or a magnesium alloy. However, the use of synthetic resin will also be possible if it can secure sufficient strength and accuracy of shape and dimensions.

The action of the shock absorbing, steering column of the present invention constructed as described above rotatably supporting a steering shaft and the action of it shortening its full length during a secondary collision to thereby protect a driver are similar to those of the aforementioned prior-art shock absorbing type steering column. Particularly, the shock absorbing type steering column of the present invention eliminates the necessity of coupling and fixing the bracket to the outer peripheral surface of the outer column later, and simplifies the manufacture of parts, the custody of parts and the assembling work and can thus reduce the costs of manufacture.

DESCRIPTION OF THE PREFERRED EMBODIMENTS

FIGS. 1 to 5 show a case where as a first embodiment of the present invention, the present invention is applied to a steering column provided with a tilt mechanism. The feature of the present invention is that a vertically movable bracket 8a, a mounting bracket 9a and a cylinder bracket 10a are integrally formed on an outer column 5a constituting the steering column. The construction and action of the other portions are substantially similar to those of the afore-described prior-art structure and therefore, equivalent portions are given the same reference characters and overlapping description will be omitted or simplified, and the characteristic portions of the present invention will be described chiefly.

The steering shaft 1a comprises a tubular outer shaft 2 and an inner shaft 3. The outer column 5a has its whole formed into a cylindrical shape by die-casting, for example, a non-ferrous metal. The vertically moveable bracket 8a, having a rectangular protruded portion 17, is formed on the underside of the fore (left as viewed in FIGS. 1, 2, 4 and 5) portion of the intermediate portion of the outer column 5a, and a through-hole 18 extending in the widthwise direction of the outer column 5a (the front to back direction as viewed in FIGS. 1, 2, 4 and 5, or the left to right direction as viewed in FIGS. 3 and 6A to 6C) is formed in the protruded portion 17, whereby the vertically movable bracket 8a is provided. A tilt bolt 13 is inserted in the through-hole 18 in the vertically movable bracket 8a, and a tilt nut 19 is threadably engaged with the tip end portion of the tilt bolt 13. By the tilt nut 19 being made operable by a tilt lever 14, there is constructed a tilt mechanism for adjusting the height position of a steering wheel.

An outwardly facing flange-like mounting bracket 9a is formed on the outer peripheral surface of the rear end portion of the outer column 5a, and a combination switch is mountable on this mounting bracket 9a. This mounting bracket 9a may be provided over the entire periphery of the outer column 5a or only a part in the circumferential direction thereof. Further, a key cylinder is mounted in a cylindrical cylinder bracket 10a extending in the widthwise direction of the outer column 5a which is integrally formed on the underside of the intermediate portion of the outer column 5a between the vertically movable bracket 8a and the mounting bracket 9a, thereby constituting a steering lock mechanism.

Further, the rear end portion (the right end portion as viewed in FIGS. 1, 2, 4 and 5) of a cylindrical inner column 6 made of a steel plate is strongly fitted to the fore end portion (the left end portion as viewed in FIGS. 1, 2, 4 and 5) of the outer column 5a for displacement only when a strong force in the axial direction of these two columns 5a and 6 (the left to right direction as viewed in FIGS. 1, 2, 4 and 5 or the front to back direction as viewed in FIGS. 3 and 6A to 6C) is applied to the columns. Therefore, in the illustrated embodiment, ridges 21 extending in the axial direction are formed at a plurality of (in the illustrated embodiment, four) locations on the inner peripheral surface of the fore end portion of the outer column 5a. When the diameter of the largest inscribed circle on the fore end portion of the outer column 5a which links the end edges of the plurality of ridges 21 together and the outer diameter of the rear end portion of the inner column 6 in its free state are compared with each other, the outer diameter of the rear end portion of the inner column 6 is a little larger than the diameter of the largest inscribed circle. When the fore end portion of the outer column 5a is to be coupled to the rear end portion of the inner column 6, a portion of the outer peripheral surface of the rear end portion of the inner column 6 is resiliently deformed diametrically inwardly, and this rear end portion is pushed into said fore end portion, thereby strongly fitting these end portions together.

If the length L (FIG. 4) of the fitted portion is secured sufficiently, the flexural rigidity of the steering column 4a comprising the outer column 5a and the inner column 6 coupled together can be secured sufficiently. Also, when a strong compression load in the axial direction is applied to the steering column 4a, the length (full length) of the steering column 4a is shortened while the plurality of ridges 21 frictionally contact with the outer peripheral surface of the inner column 6.

As described above, in the shock absorbing type steering column of the present invention, the vertically movable bracket 8a, the mounting bracket 9a and the cylinder bracket 10a are formed integrally with the outer column 5a and therefore, the trouble of coupling and fixing the brackets 8a, 9a and 10a to the outer peripheral surface of the outer column 5a later becomes unnecessary. As a result, the manufacture of parts, the custody of parts and the assembling work are all simplified and the costs of manufacture of the shock absorbing type steering column can be reduced.

Figure 3:
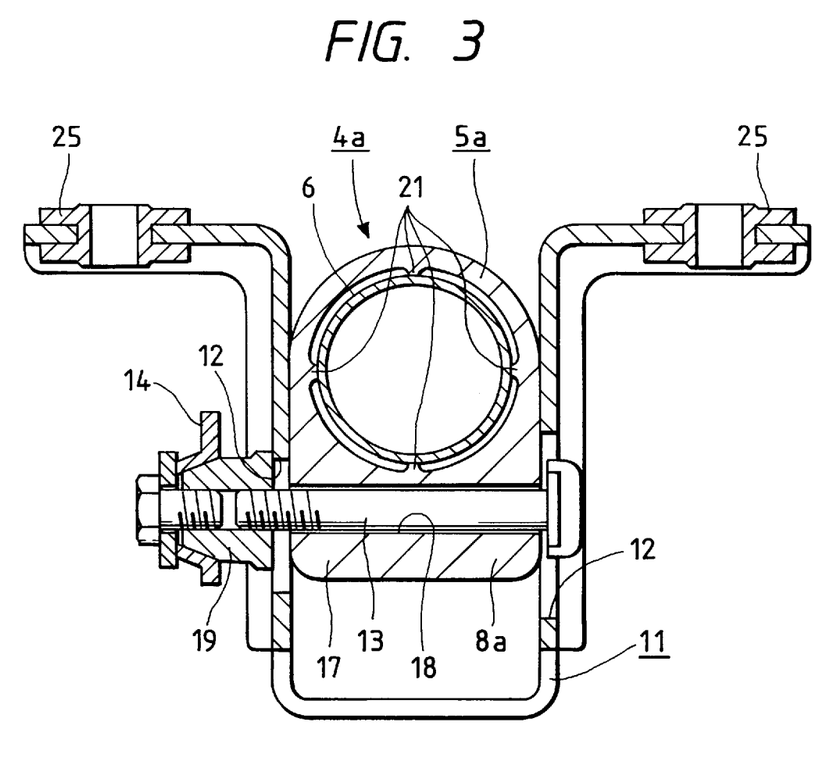
FIG. 3 is a cross-sectional view taken along the line III—III of FIG. 2.
Figure 4:
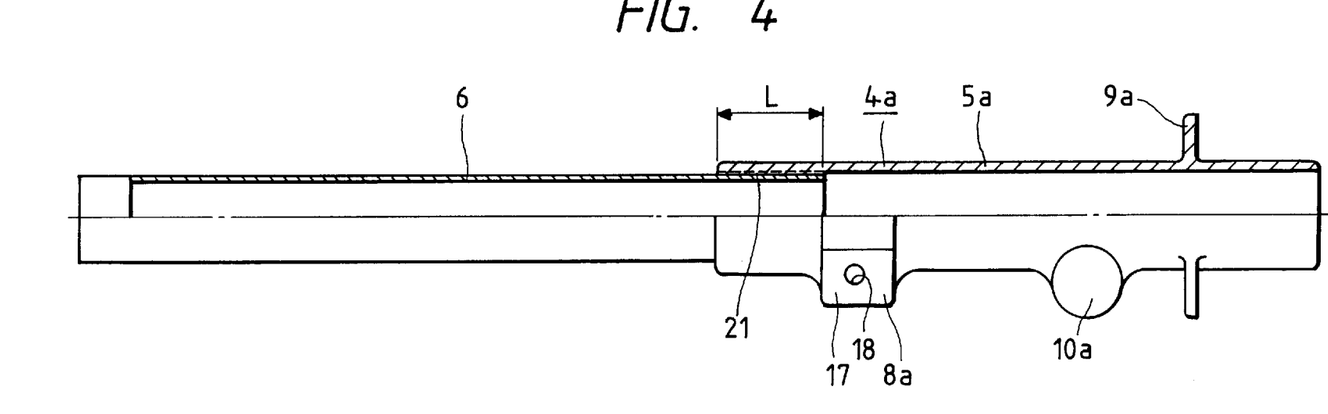
FIG. 4 is a side view partly in longitudinal cross-section showing an outer column and an inner column as they are simply combined together.
Figure 5:
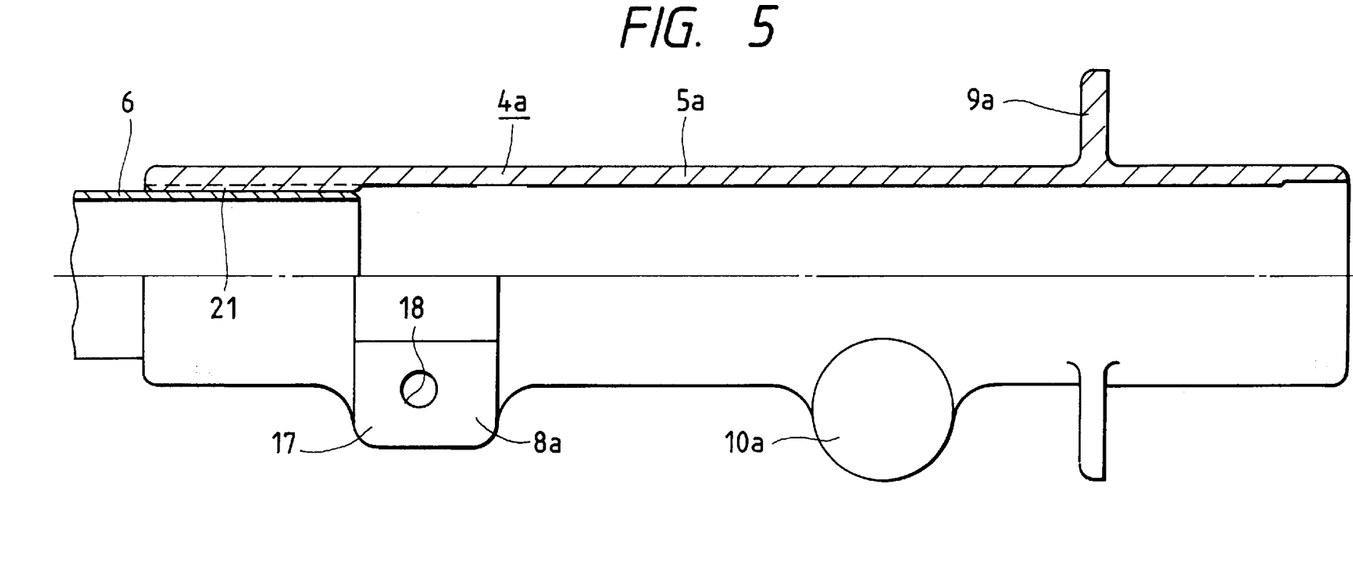
FIG. 5 is an enlarged view of the right portion of FIG. 4.
Figure 6A:
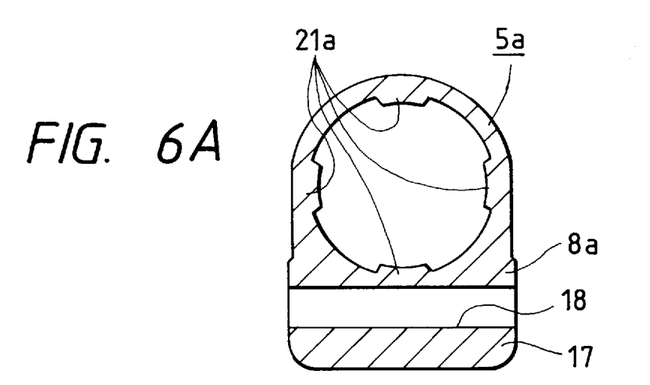
FIGS. 6A to 6C are cross-sectional views taken in the same direction as FIG. 3 but showing three examples of another structure of the coupling portion between the outer column and the inner column.
Figure 6B:
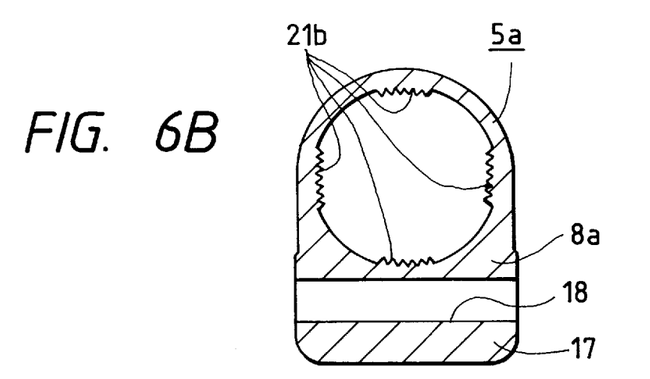
Figure 6C:
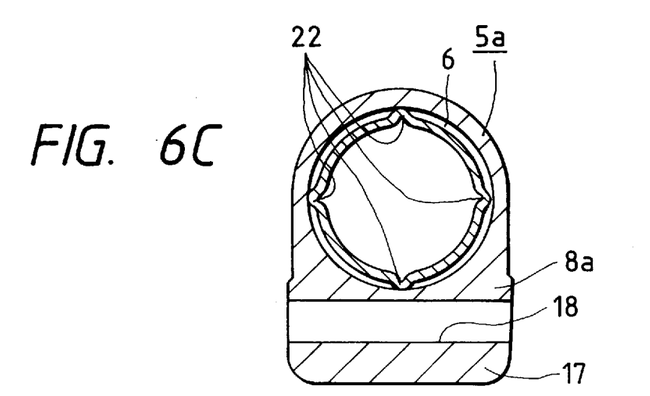

The structure of the coupling portion between the fore end portion of the outer column 5a and the rear end portion of the inner column 6 may be such structure that secures sufficient flexural rigidity and yet can shorten the full length on the basis of a strong compression load, and is not limited to the structure of the first embodiment shown in FIGS. 1 to 5, but such structures as shown, for example, in FIGS. 6A–6C can also be adopted. The structure shown in FIG. 6A is one in which wide ridges 21a are formed to thereby increase the area of contact between the end surfaces of these ridges 21a and the outer peripheral surface of the inner column 6 (FIG. 3). Thus increasing the area of contact is considered to be useful to improve the flexural rigidity.

Next, the structure shown in FIG. 6B is such that ridges 21b are made into a fine waveform-like shape to thereby increase the coefficient of friction in the circumferential direction between the end surfaces of these ridges 21b and the outer peripheral surface of the inner column 6. Thus increasing the coefficient of friction in the circumferential direction is also considered to be useful to improve the flexural rigidity.

Further, the structure shown in FIG. 6C is such that instead of the inner peripheral surface of the fore end portion of the outer column 5a formed with ridges a plurality of axially elongated in the shown example, four) ridges 22 (the front to back direction as viewed in FIGS. 6A to 6C) are formed on the outer peripheral surface of the rear end portion of the inner column 6. The diameter of the circumscribed circle of these ridges 22 in their free state is made larger than the inner diameter of the fore end portion of the outer column 5a. When the fore end portion of the outer column 5a is to be coupled to the rear end portion of the inner column 6, the outer diameter of the rear end portion of this inner column 6 is resiliently shortened and yet this rear end portion is pushed into the fore end portion of the outer column 5a. In the case of such structure, the shape of the inner peripheral surface of the outer column 5a becomes simple and correspondingly thereto, a mold for die-casting the outer column 5a can be simplified.

Figure 7:
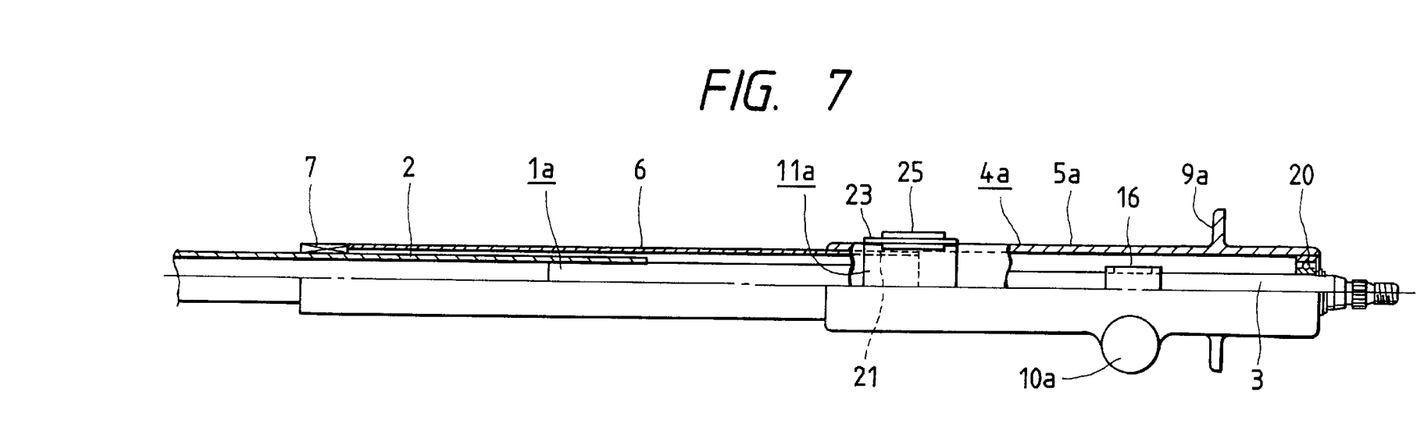
FIG. 7 is a side view partly in longitudinal cross-section showing a second embodiment of the present invention.
Figure 8:
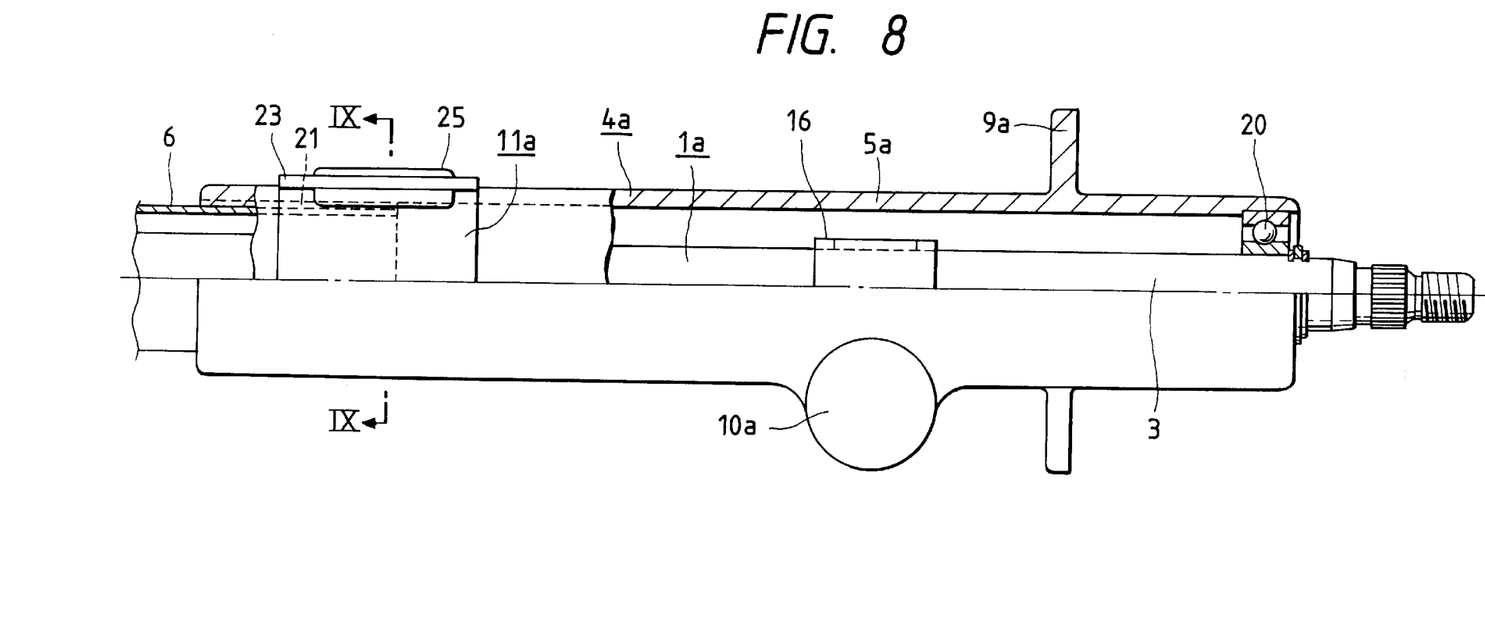
FIG. 8 is an enlarged view of the right portion of FIG. 7.
Figure 9:
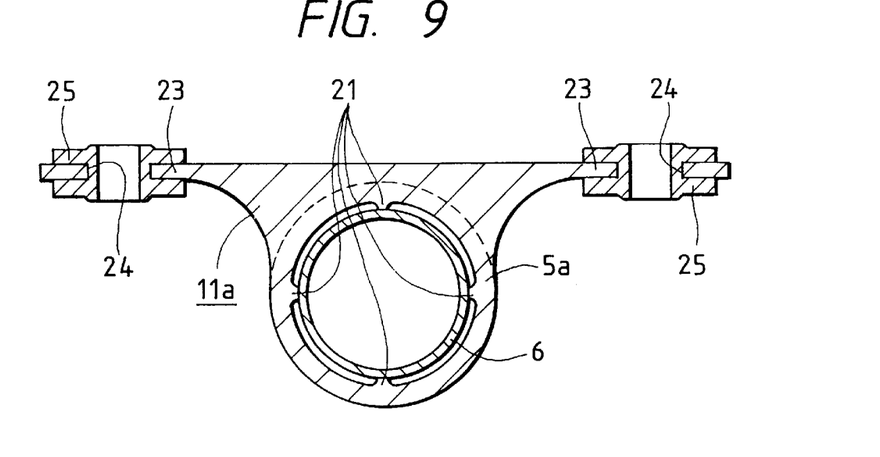
FIG. 9 is a cross-sectional view taken along the line IX—IX of FIG. 8.

FIGS. 7 to 9 show a second embodiment of the present invention. In the case of this embodiment, the present invention is applied to a steering column which has no tilt mechanism and cannot effect the adjustment of the position of a steering wheel. Therefore, in the present embodiment, the vertically movable bracket 8a (FIGS. 1 to 6C) formed on the underside of the fore end portion of the outer column 5a in the aforedescribed first embodiment is omitted and instead, a fixed bracket 11a is formed on the fore end portion of the outer column 5a integrally with this outer column 5a. Besides the fixed bracket 11a, a mounting bracket 9a and a cylinder bracket 10a are integrally formed on the outer column 5a formed by die-casting a non-ferrous metal.

The fixed bracket 11a has a pair of left and right fixed plate portions 23 protruding outwardly in the widthwise direction (the front to back direction as viewed in FIGS. 7 and 8, or the left to right direction as viewed in FIG. 9) from the upper portion of the fore end of the outer column 5a. These fixed plate portions 23 are formed with cut-aways 24 and 24 opening into the rear end edge (the right end edge as viewed in FIGS. 7 and 8), and restraining pieces 25 are restrained in these cut-aways 24 and 24. When the outer column 5a is to be supported on and fixed to a vehicle body, bolts having these restraining pieces 25 are inserted therein and threadably engaged with threaded holes formed in the vehicle body. In this state, the steering column 4a is supported on the vehicle body, but unlike the aforedescribed first embodiment, the outer column 5a cannot be moved up and down to adjust the height position of the steering wheel.

When with a secondary collision, a strong force directed forwardly of the outer column 5a is applied and this outer column 5a is forwardly displaced, whereby the full length of the steering column 4a is shortened, the restraining pieces 25 and 25 slip out of the cut-aways 24 and 24. The construction and action of the other portions are similar to those of the aforedescribed first embodiment and therefore, equivalent portions are given the same reference characters and need not be described.

Figure 10:
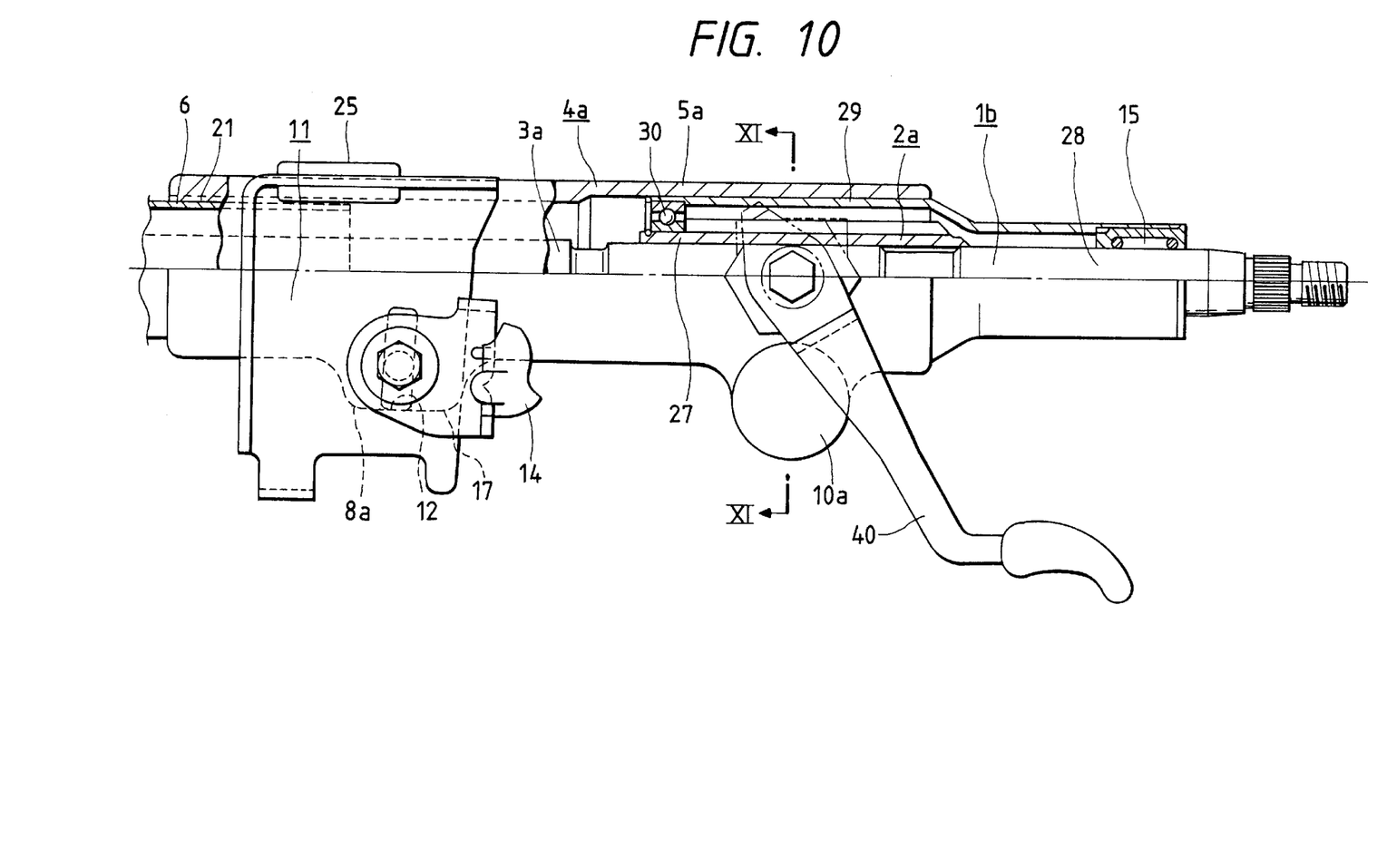
FIG. 10 is a side view partly in longitudinal cross-section showing the essential portions of a third embodiment of the present invention.
Figure 11:
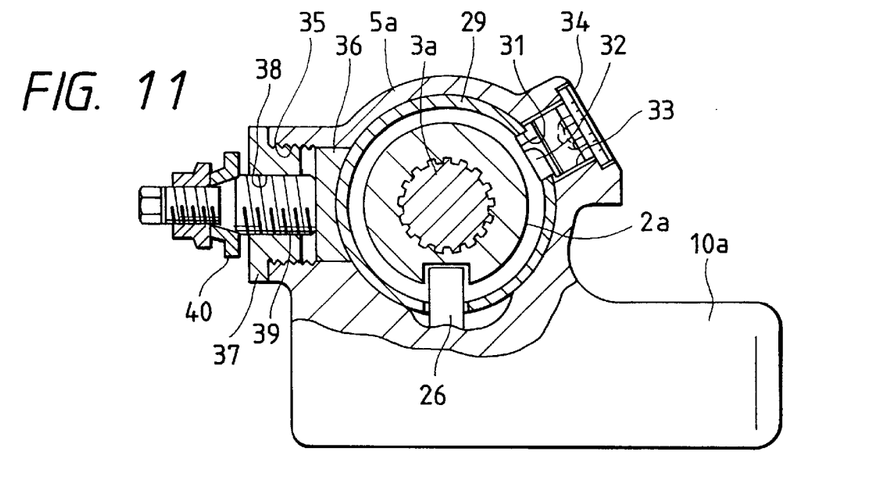
FIG. 11 is a cross-sectional view taken along the line XI—XI of FIG. 10.

FIGS. 10 and 11 show a case where as a third embodiment of the present invention, the present invention is applied to a steering column provided with a telescopic mechanism for adjusting the longitudinal position of a steering wheel, in addition to the tilt mechanism. The tilt mechanism portion is similar to that in the aforedescribed first embodiment and therefore, the structure of the telescopic mechanism portion will hereinafter be described.

A steering shaft 1b comprises an outer shaft 2a coupled to the rear end of an inner shaft 3a in the axially intermediate portion for displacement only in the axial direction. The outer shaft 2a comprises a tubular portion 27 spline-engaged with the rear end portion of the inner shaft 3a, and a circular rod portion 28 connected and fixed to the rear side of the tubular portion 27 by welding. Such an outer shaft 2a is rotatably supported in a cylindrical upper column 29 through a needle bearing 15 and a deep groove type ball bearing 30.

The fore half (the left half as viewed in FIG. 10) of the upper column 29 is inserted in the outer column 5a for displacement only in the axial direction (the left to right direction as viewed in FIG. 10, or the front to back direction as viewed in FIG. 11). Therefore, an axially long slot 31 is formed in a portion of the upper column 29, and a guide roller 32 is engaged with this slot 31. In order to support this guide roller 32 for rotation, only a restraining screw 34 is screwed in a threaded hole 33 formed in a portion of the outer column 5a, and the guide roller 32 is supported on the tip end portion of the restraining screw 34 for rotation only.

Also, a cylinder hole 35 opening into the inner and outer peripheral surfaces of the outer column 5a is formed in that portion of the side of the outer column 5a which is opposed to the side of the fore half of the upper column 29. The inner side of a pressing piece 36 inserted in the inner part of this cylinder hole 35 is opposed to the side of the fore half of the upper column 29. Also, a pressing screw 39 is threadably engaged with a threaded hole 38 formed in the central portion of a lid member 37 threadably engaged with and fixed to the opening portion of the cylinder hole 35. This pressing screw 39 is operable by a telescopic lever 40.

When the longitudinal position of the steering wheel is to be adjusted, the telescopic lever 40 is operated in a predetermined direction to thereby release the force which urges the pressing piece 36 against the side of the fore half of the upper column 29. The longitudinal position of the steering wheel is then adjusted while the upper column 29 slides longitudinally inside the outer column 5a. After the adjustment, the telescopic lever 40 is operated in the opposite direction to thereby urge the pressing piece 36 against the outer side of the fore half of the upper column 29, and fix this upper column 29 to the inner side of the outer column 5a.

In the case of the present embodiment, the telescopic mechanism is additionally provided to thereby make the longitudinal position of the steering wheel adjustable and the telescopic lever 40 is provided on the outer peripheral surface of the rear end portion of the outer column 5a and correspondingly thereto, a mounting bracket for combination switches is not formed on the outer column 5a. However, again in the case of the present embodiment, the vertically movable bracket 8a and the cylinder bracket 10a are formed integrally with the outer column 5a, whereby the costs of manufacture are reduced.

Figure 12:
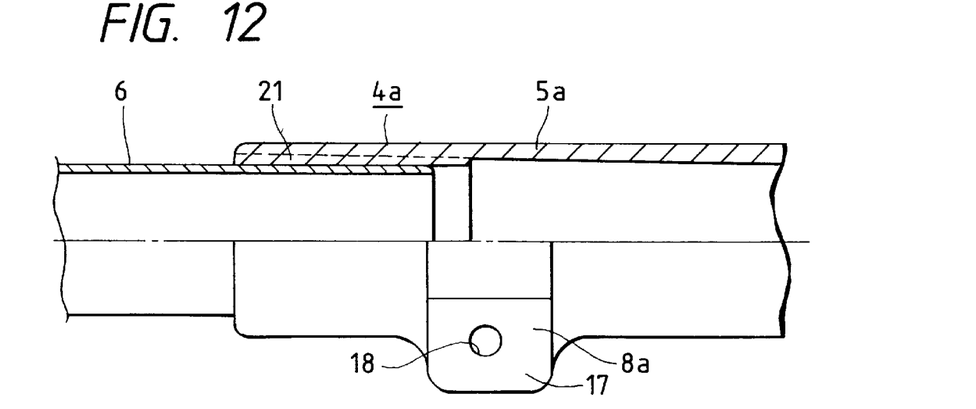
FIG. 12 is a side view half in longitudinal cross-section showing another example of the structure of the coupling portion between the outer column and the inner column.

FIG. 12 shows a fourth embodiment of the present invention. In this embodiment, the inner diameter of the outer column 5a is made smaller from the front toward the rear (from the left toward the right as viewed in FIG. 12). The positions of the end edges of ridges 21 formed on the inner peripheral surface of the fore end portion of the outer column 5a (the diameters of the largest inscribed circles of the ridges 21) are made equal over the full length. In the case of the present embodiment, by the shape of the outer column 5a being made so, not only lapping becomes easy to do when die-casting this outer column 5a, but also the load required to shorten the full length of the steering column 4a during a collision can be made gradually greater.

That is, when the full length of the steering column 4a is shortened to a certain degree and the outer peripheral surface of the rear end portion of the inner column 6 comes to bear against the inner peripheral surface of the outer column 5a, it becomes necessary to squeeze the rear end portion of the inner column 6 in order to further shorten the full length of the steering column 4a. Therefore, the load required to shorten the full length of the steering column 4a becomes gradually greater. As a result, the design for more effectively achieving the protection of the driver during a secondary collision becomes easy. In the other points, the construction and action of the present embodiment are the same as those of any of the above-described embodiments.

The shock absorbing type steering column of the present invention is constructed and acts as described above and therefore, a reduction in the costs of manufacture can be achieved by the simplification of the manufacture of parts, the custody of parts and the assembling work.

What is claimed is:

1. A shock absorbing steering column comprising:
   an outer column, an inner column inserted in said outer column, and at least a first bracket fixed to an outer peripheral surface of said outer column,
   wherein said outer column and said bracket are integrally formed of a non-ferrous material, said outer column and said inner column are strongly fitted together through axially extending radial projections that are provided on one of said outer column and said inner column and that engage the other column to produce a resilient deformation, and said outer column and said inner column are spaced from one another at regions between said projections by substantially a radial thickness of said projections, such that said outer column and said inner column are relatively axially displaceable only when a strong force in an axial direction is applied thereto.

2. A shock absorbing steering column according to claim 1, wherein said projections are provided on an inner peripheral surface of said outer column.

3. A shock absorbing steering column according to claim 2, wherein the projections have arcuate surfaces which engage said inner column.

4. A shock absorbing steering column according to claim 2, wherein the projections have serrated portions which engage said inner column.

5. A shock absorbing steering column according to claim 2, wherein said projections are provided on an outer peripheral surface of said inner column.

6. A shock absorbing steering column according to claim 2, wherein an inner peripheral surface of said outer column is tapered at a fitting area of said outer and inner columns.

7. A shock absorbing steering column according to claim 1, wherein said first bracket is a bracket for securing the steering column to a vehicle body.

8. A shock absorbing steering column according to claim 7, wherein a mounting bracket for accessories is also integrally formed on the outer peripheral surface of said outer column.

9. A shock absorbing steering column according to claim 7, wherein a key cylinder bracket is also integrally formed on the outer peripheral surface of said outer column.

10. A shock absorbing steering column according to claim 7, wherein the first bracket is a bracket for a position adjustment mechanism for said steering column.

11. A shock absorbing steering column according to claim 1, wherein all brackets attached to the outer peripheral surface of said outer column are integrally formed on the outer peripheral surface of said outer column.

* * * * *